United States Patent
Weiland et al.

(10) Patent No.: US 10,060,712 B2
(45) Date of Patent: Aug. 28, 2018

(54) REMOTE DETECTION OF GUN PROJECTILES

(71) Applicants: Christopher J. Weiland, King George, VA (US); Daniel P. Holden, Fredericksburg, VA (US); John W. Deasy, Fredericksburg, VA (US)

(72) Inventors: Christopher J. Weiland, King George, VA (US); Daniel P. Holden, Fredericksburg, VA (US); John W. Deasy, Fredericksburg, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 149 days.

(21) Appl. No.: 15/133,027

(22) Filed: Apr. 19, 2016

(65) Prior Publication Data

US 2017/0343326 A1    Nov. 30, 2017

Related U.S. Application Data

(60) Provisional application No. 62/310,622, filed on Mar. 18, 2016.

(51) Int. Cl.
| | |
|---|---|
| *G08B 19/00* | (2006.01) |
| *F41J 5/056* | (2006.01) |
| *H04Q 9/00* | (2006.01) |
| *F41J 5/14* | (2006.01) |

(52) U.S. Cl.
CPC ............. *F41J 5/056* (2013.01); *F41J 5/14* (2013.01); *H04Q 9/00* (2013.01); *H04Q 2209/40* (2013.01); *H04Q 2209/823* (2013.01)

(58) Field of Classification Search
CPC ........................................ F41J 5/056
See application file for complete search history.

(56) References Cited

U.S. PATENT DOCUMENTS

| | | | |
|---|---|---|---|
| 8,523,185 B1 * | 9/2013 | Gilbreath | F41J 5/056 273/348 |
| 2011/0311949 A1 * | 12/2011 | Preston | F41G 3/26 434/16 |

* cited by examiner

*Primary Examiner* — Amine Benlagsir
(74) *Attorney, Agent, or Firm* — Gerhard W. Thielman (57) ABSTRACT

A sensor system is provided for monitoring anti-personnel effectiveness of a gun that fires a projectile against a mannequin target. The system includes an instrumentation sensor, an aggregation controller and a base station. The instrumentation sensor is disposed on the target. The sensor transmits a status condition based on electrical integrity. The status condition is either intact as default or else disablement in response to impact from the projectile. The aggregation controller receives the status condition from the sensor and transmits the status information as aggregated information. The base station receives the aggregated information for analysis to determine the effectiveness in response to the gun firing at the target.

13 Claims, 5 Drawing Sheets

REMOTE DETECTION OF GUN PROJECTILES

CROSS REFERENCE TO RELATED APPLICATION

Pursuant to 35 U.S.C. § 119, the benefit of priority from provisional application 62/310,622, with a filing date of Mar. 18, 2016, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to a sensor test configuration. In particular, the invention relates to sensor and communications design to monitor effectiveness of munitions against targets using feedback from the sensors.

Armed Forces service personnel train in live gunfire testing. To determine effectiveness, the United States Navy places mannequins—skeletonized human cutouts made of plywood—on a remote controlled boat to simulate a target and shoot at them from a combat vessel. As the small boat maneuvers the vessel fires its gun at the boat. The pattern of fragmentation produced when the round explodes near the target is important to determine whether or not personnel on the target boat have been incapacitated. Without a system capable of communicating exactly where the mannequins are hit, such as critical areas (heart, lungs, etc.) or non-critical areas (extremities) in approximately real-time, the gunner does not know when the mannequins were incapacitated. Additionally, with data conventionally recorded at the target, sinking of the target boat can cause loss of acquired measurements.

SUMMARY

Conventional sensor configurations yield disadvantages addressed by various exemplary embodiments of the present invention. In particular, exemplary embodiments provide a sensor system for monitoring anti-personnel effectiveness of a gun that fires a projectile against a mannequin target. The system includes an instrumentation sensor, an aggregation controller and a base station. The instrumentation sensor is disposed on the target. The sensor transmits a status condition based on electrical integrity. The status condition is either intact as default or else disablement in response to impact from the projectile. The aggregation controller receives the status condition from the sensor and transmits the status condition as aggregated information. The base station receives the aggregated information for analysis to determine the effectiveness in response to the gun firing at the target.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

Exemplary embodiments describe an Automatic Hit Detection System (ANDS) for real-time impact-detection for test shooters. This system has been developed at Naval Surface Warfare Center Dahlgren Division (NSWCDD) for gunfire target testing at the Potomac River Test Range (PRTR). The system includes a plurality of targets equipped with sensors, a remote relay device to interrogate and transmit information from the sensors, and a monitor station for receiving and interpreting the sensor information.

Figure 1:
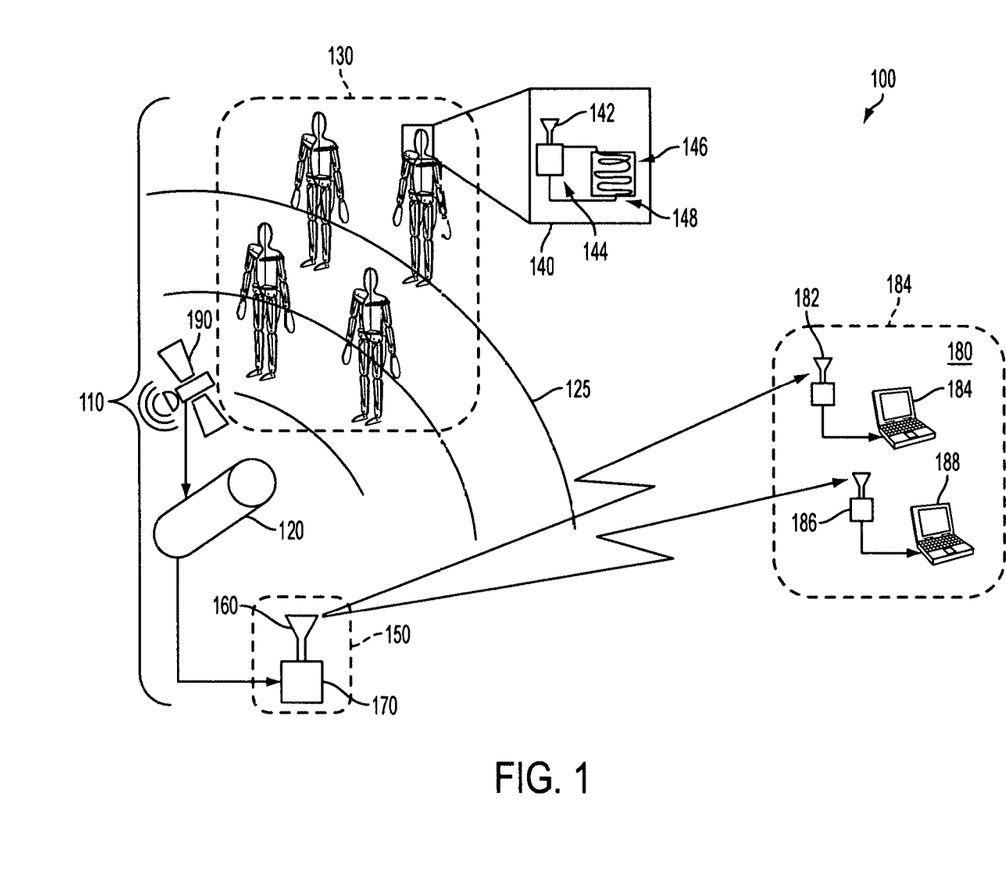
FIG. 1 is a perspective view of an exemplary sensor system.

FIG. 1 shows a perspective view 100 of an exemplary AHDS 110. An aggregation controller 120 emits radio frequency (RF) signals 125 towards a set of targets 130. Each target 130 can be equipped with at least one sensor module 140 having a data transceiver 142, a power-and-logic microcontroller 144, frangible impact detector 146 and electric circuit 148. The microcontroller 144 provides electrical current that passes through the circuit 148 while the detector 146 remains intact. The aggregation controller 120 interrogates the sensor modules 140, in particular the state of the detector 146 via the transceiver 142. In the absence of prompting by the aggregation controller 120, the transceiver 142 can behave as a transmitter to automatically provide status information, either by broadcast or dedicated channel.

To accomplish this interface with the sensor modules 140, the aggregation controller 120 communicates using a relay device 150 (either integrated integrally or connected separately) that includes a transceiver 160 and a power-logic circuit 170 to combine all the sensor data (from the modules 140) into a single data stream. The power-logic circuit 170 operates as a master controller for the relay device 150 to coordinate reception from the sensor modules 140 upon interrogation by the aggregation controller 120. The relay's transceiver 160 forwards the data stream to a set of base receiving stations 180 for monitoring the detectors 146 on their targets 130. For example, a first station can include a relay device 182 and a monitor 184, as well as a second station with a relay device 186 and a monitor 188.

A kinetic impact to a sensor module 140 from a gun-fired projectile registers as an event, corresponding to a particular time during engagement with the targets 130. To provide a timestamp, the aggregation controller 120 also communicates with a Global Positioning System (GPS) satellite receiver module 190 (depicted as a satellite icon) for indicating event times.

Figure 2:
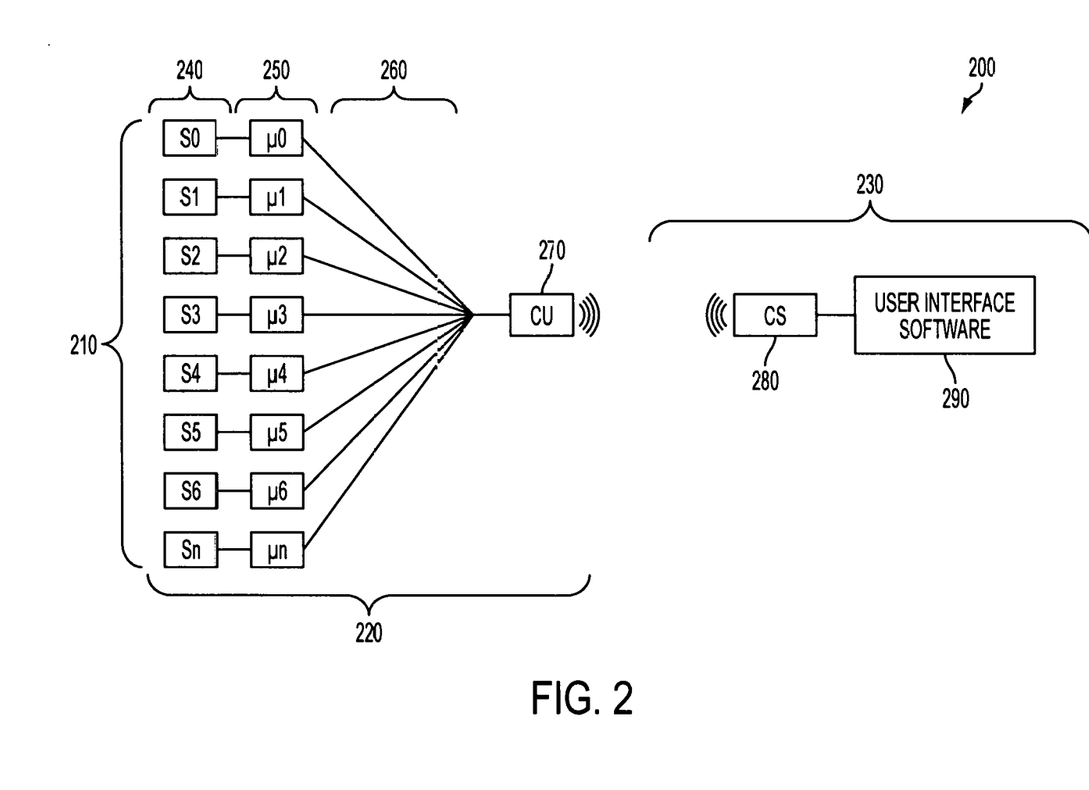
FIG. 2 is a block diagram view of an exemplary system topology.

FIG. 2 shows a block diagram view 200 of an exemplary system topology 210. An array of sensors 220 for the targets 130, each with modules 140, communicates with a remote processor 230. The array 220 includes a series of frangible sensors 240 labeled $S_0$ through $S_n$, and complementary series of microcontrollers 250 labeled $\mu_0$ through $\mu_n$. Each such sensor 240 effectively includes the detector 146 and associated circuit 148, which effectively serves as a kinetic fuse. The microcontrollers 250 communicate through a wiring bus 260 to a data collection and distribution station 270 in the processor 230, which transmits signals to a receiving station 280 that connects to user interface software 290 for information display. Alternatively, the wiring bus 260 composed of conductor connections in a harness can be replaced with wireless transmitters.

The power-and-logic microcontroller 144 has a voltage potential across the detector 146 via the circuit 148. This potential is measured by the associated microcontroller 250, and changes in response to fracture upon kinetic energy absorption from a gun-launched projectile. Each sensor module 140 transmits a unique n-bit length binary signal: for example "0010 0001 0 1" translates to serial number two (0010), sensor position one (0001) and sensor active (not broken). When struck by a projectile, the detector 146 fractures, interrupting the circuit 148 and causing change in state of the sensor module 140. Its potential changes to "0010 0001 0 0" that translates to sensor broken for the same prior serial number and position.

Figure 3:
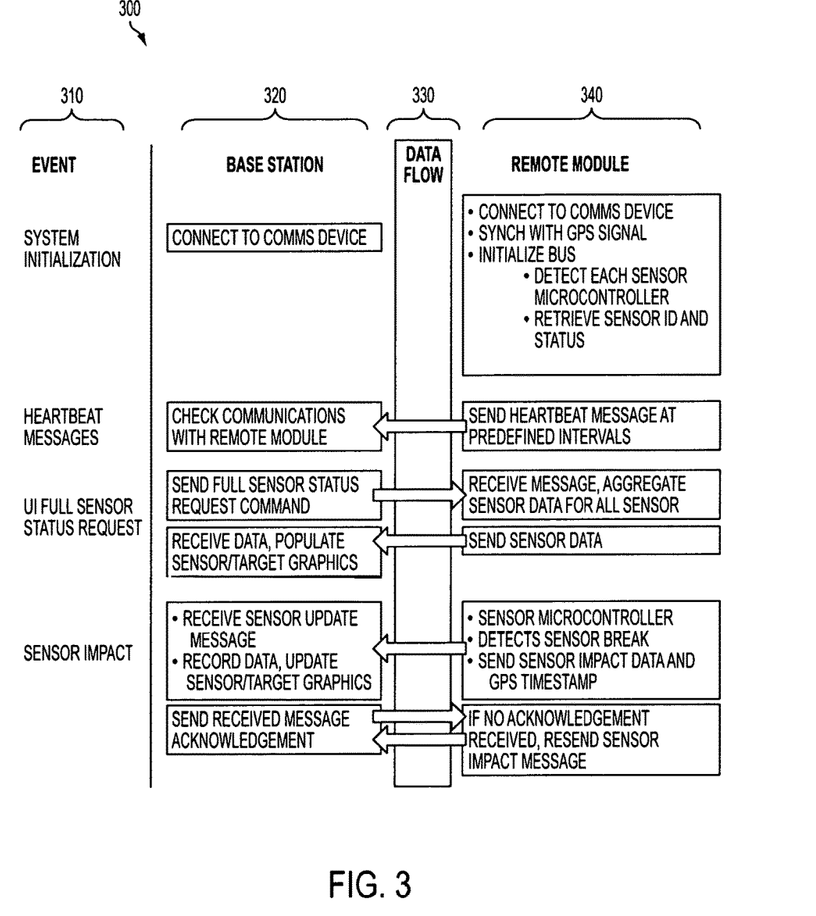
FIG. 3 is a flowchart diagram view of system operation.

FIG. 3 shows a flowchart diagram view 300 of system operation shown in tabular form. The process is triggered by an event 310, each of which is associated with a base station 320, analogous to the receiving station 180. Data flow 330 indicates direction of information. A remote relay 340, analogous to the aggregation controller 120, transmits to and receives from information across the data flow 330 with the base station 320 in a feedback arrangement.

For example, the remote relay 340 sends heartbeat, and the base station 320 replies with a request command on full sensor status. The remote relay 340 responds with additional sensor data. If the remote relay 340 detects sensor breakage, impact data and associated timestamp are sent to the base station 320. To maintain accuracy for the timestamps, the chronology is preferably synchronized by a GPS receiver 190, although alternate forms of synchronization can be contemplated without departing from the inventive scope. The timestamp identifies the time at which an impact event has occurred. As a measure of firing effectiveness, upon disablement of a target 130 at a particular time, further strikes constitute unnecessary ammunition consumption and unwarranted attention to a disabled target.

Figure 4:
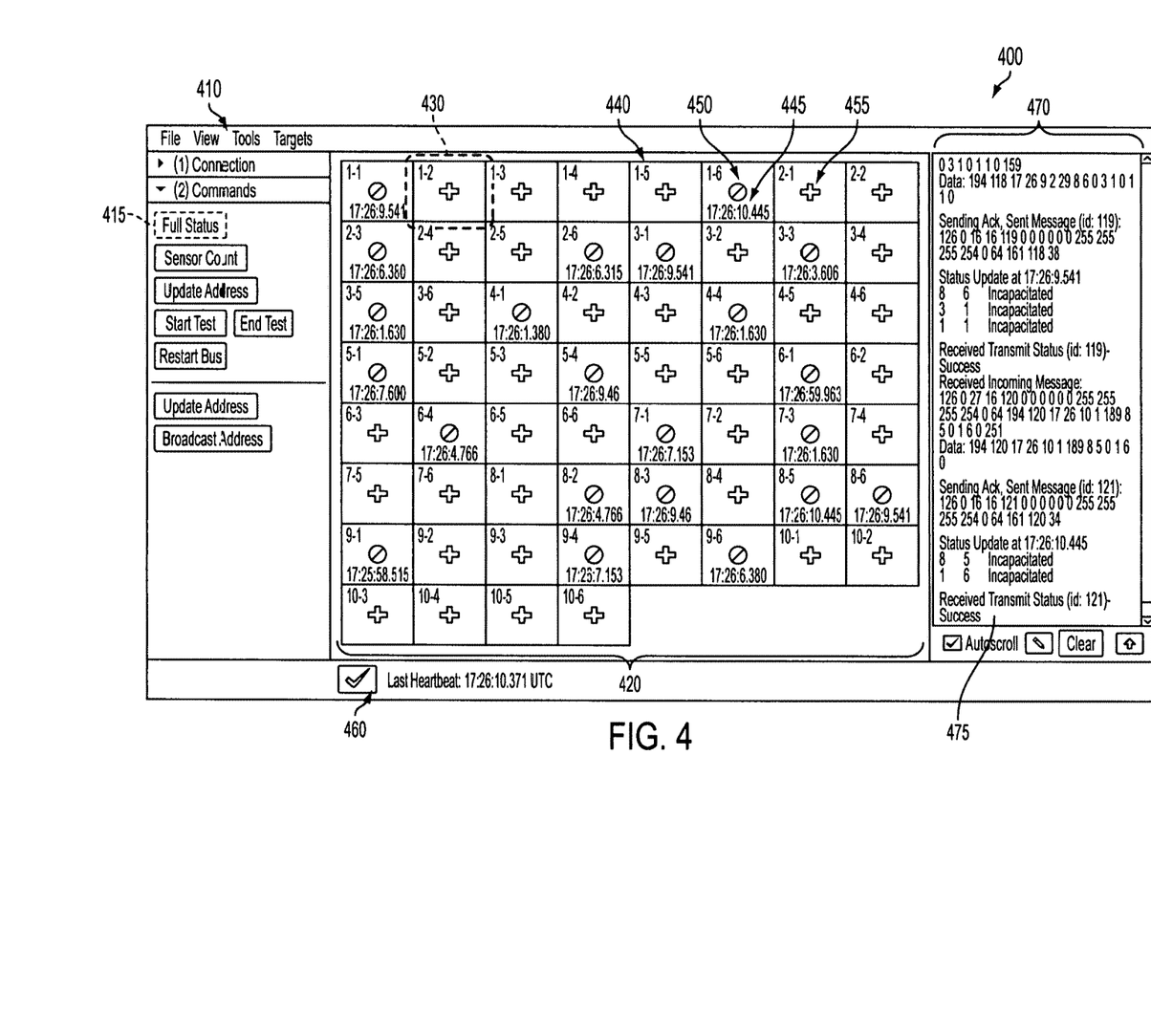
FIG. 4 is a display view of generic target information.

FIG. 4 shows a first display view 400 of generic target information. A toolbar 410 includes a command pane 415 with various selectable commands. A target panel 420 presents an array of generic target panes 430, each including information such as sensor identification 440 and impact timestamp 445 (once applicable). In the center (for the illustrated embodiment) sensor status can be depicted by an icon as either "dead" 450 or "alive" 455. A communications status monitor 460 uses last heartbeat in the panel 420 to confirm transmission of communication signals. A message data log panel 470 includes event entries 480 based on GPS timestamps, particularly information on incapacitated targets, corresponding to the dead status 450.

Figure 5:
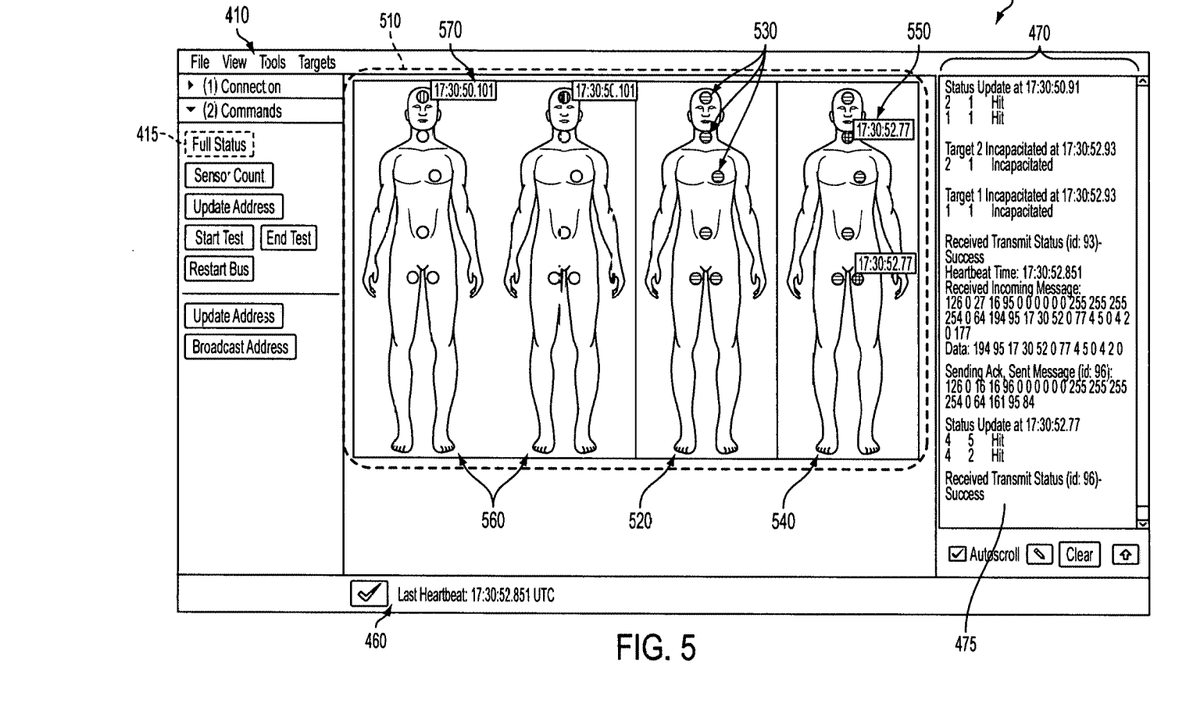
FIG. 5 is a display view of lethality target information.

FIG. 5 shows a second display view 500 of lethality assessment target information. The toolbar 410 and message panel 470 flank a target map 510 with human figures in three panes (left-to-right, respectively): incapacitated, healthy and wounded. A healthy target 520 has sensor locations 530 with associated status indicators with all sensor modules 140 intact. A wounded target 540 includes impact timestamps 550 for non-lethal strike locations. An incapacitated target 560 includes incapacitation timestamps 570 for mortal strike locations. The sensor module 140 indicates the moment its detector 146 fractures or breaks (i.e., —disintegrates into fragments thereby interrupting the circuit 148) from an ammunition strike.

The target 130 preferably includes several instrumentation sensors. Each sensor module 140 is disposed at an anatomically analogous location in relation to disablement status that indicates firing effectiveness on the target. This disablement status can be healthy, wounded or incapacitated. In particular, healthy 520 means absence of impact, wounded 540 means a non-lethal impact from a projectile at a non-vital sensor-location on the target 130, and incapacitated 560 means a mortal impact at a vital sensor location on the target 130.

Exemplary embodiments provide sensors and supporting system that enable near or real-time detection of contact points in which kinetic energy transfers from a projectile to the target 130. The exemplary system operates in both line-of-sight and over-the-horizon modes. One implementation of the proposed system constitutes a network of sensors 140 embedded on a mannequin target 130 for weapon lethality studies or training practice. Combat personnel in all branches of the United States armed forces must train in live gunfire testing.

For example, the Navy plans to use mannequins on a remote controlled boat to simulate the targets 130 and shoot at them as simulated personnel from a combat vessel. An exemplary mannequin would be a skeletonized human cut-out made of plywood. As the small boat maneuvers the vessel fires its gun at the target 130.

A pattern of fragmentation is produced when a round fired from the gun explodes near the target 130. This is important for determining whether or not the simulated personnel on the target boat have been incapacitated. Without a system capable of communicating exactly where the target mannequins are struck, such as critical areas (heart, lungs, etc.) or non-critical areas (extremities) in real or near real time, the gunner cannot know when the mannequins would have been incapacitated, and thus the effectiveness of targeting. The exemplary system fills this capability deficiency.

The sensor module 140 includes a detector 146 composed of a frangible material (clay, ceramic, paper, etc.) is coated with a network of small, easily breakable electrical traces 148. The sensor shape can be made to roughly approximate various shapes (e.g., an annular tube represents the spinal column). Each detector 146 connects to the microcontroller 144 that monitors the state of the detector 146 and encodes the sensor serial number and sensor state (i.e., intact or broken). The sensor module 140 can transmit its status signal either via wire or wirelessly (e.g., radio frequency identification device or RFID) to the aggregation controller 120 via the transceiver 160.

Many sensors 240 connect to a common bus 260, which manages all sensor transmissions and re-transmits them to a base station 180 using radio or satellite communications. This network of remote sensors 240, microcontrollers 250 communicates via the bus 260 with the aggregation controller 120, which also includes the GPS receiver 190 to tag each detector impact with a GPS timestamp. Multiple base stations 180 can monitor the states of all sensors in near or real-time via a Graphical User Interface (GUI).

The base stations 180 include user interface software 290 that graphically displays the current status of each sensor 240 by parsing and interpreting the sensor data received over communications. This user interface software 290 also enables an operator to communicate and send commands to the aggregation controller 120 and sensors 140. Upon completion of the firing test, the GUI processes the sensor impact data by specific analyses for assessing test or training-performance objectives. The user interface software 290 logs the sensor impact data and communications sent between the aggregate controller 120 and the base station 180.

To engage a target 130, a shooter must have feedback to be able to recognize how effective firing projectiles can be. A gap exists in the conventional training procedures that exemplary embodiments solve. Conventional methods for training do not provide real-time feedback to the shooter, rendering training more difficult. The exemplary process and the complementary devices can be used by all branches of the armed forces for training or Test and Evaluation purposes with live ammunition. The embodiments enable real or near real-time monitoring of sensor systems, including for joint live fire (JLF), without requiring post-test shot analysis, as needed for conventional evaluations.

Architecture for the aggregation controller 120 was designed using inexpensive, programmable COTS hardware to provide a low-cost, replaceable system. A system of inexpensive, 8-bit microcontroller units (MCUs 250) interface with the detectors 146 (in their hit-detection-sensors 140) constructed from a frangible substrate material (ceramic tiles, paper/plastic break-screens, molded epoxy, etc.) overlaid with a conductive trace (e.g., wiring 148). The MCU 250 registers the change in voltage across the sensor 140 when the detector 146 is struck and fractured. The MCU 250 relays this voltage change information to the power-logic circuit 170 that serves as a master controller, which includes a more advanced MCU interfaced with other COTS hardware. Destruction of a sensor 140 triggers a change in health status of the target 130, this event information is collected by the circuit 170 and wirelessly transmitted to the GUI to display which region on a specific target was destroyed.

The circuit 170 preferably employs a GPS receiver module 190 in conjunction with the transceiver 160 to tag each event with a timestamp that enables the GUI to determine the timeframe in which the specific target or threat is considered fully incapacitated. Communications between the circuit 170 and GUI was developed with an RF transceiver 160, but other devices, such as a satellite radio, could also be used by writing a new code library and substituting it into the master controller's Object-Oriented (OO) code design.

The AHDS 110 was designed to be both scalable and modular. The circuit 170 as master controller can communicate with up to one-hundred-twenty different sensor devices 140, and multiple systems can be used to collect and transmit sensor information to a GUI or alternative user interface. The communications bus 260 between the circuit 170 and sensor devices 140 was developed using a hard-wired solution for proof-of concept and faster bit-rates, but several alternate communications mediums could be employed.

Development of an in-house active radio-frequency identification (RFID) solution is currently under development, and a passive RFID solution is planned. The GUI prototype was developed in LabView and graphically displays the current status of sensors 140 and enables communications with the aggregation controller 120. As the GUI is further refined and matured, the code can be adapted to JAVA, a free programming language that can enable the code to be compiled once and execute on any computer platform.

The underlying architecture of the AHDS is also easily adaptable and modifiable, and has already been used on several other projects at NSWCDD. This architecture enables wireless transmission of data collection by different instrumentation at a remote location, such as a target boat on the PRTR, an Unmanned Aerial Vehicle (UAV), or an aerostat, to a GUI for real-time display at a base station 180.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A sensor system for monitoring anti-personnel effectiveness of a gun that fires a projectile against a mannequin target, said system comprising:
   an instrumentation sensor for disposition at an anatomical position on the target, said sensor transmitting a status condition based on electrical integrity, said status condition being one of intact as default and disablement in response to impact from the projectile, said default indicating electrical connection and said disablement indicating electrical disconnection;
   an aggregation controller for receiving said status condition from said instrumentation sensor and transmitting said status condition and said anatomical position as aggregated information; and
   a base station for receiving said aggregated information for analysis to determine the effectiveness in response to the gun firing at the target, wherein
   said instrumentation sensor includes:
   a frangible substrate that fractures upon said impact, thereby altering said status condition from said intact to said disablement,
   a transmitter for sending said status condition to said aggregation controller,
   an electrical circuit disposed on said substrate that passes current therethrough absent said impact, and interrupts said current in response to disintegration of said substrate from said impact, and
   a microprocessor for providing control for said transmitter and said current to said circuit, the target includes a plurality of instrumentation sensors, each instrumentation sensor being disposed at an anatomically analogous location in relation to a disablement status that indicates the effectiveness on the target, and said disablement status includes one of healthy, wounded and incapacitated such that healthy indicates impact absence, wounded indicates a non-lethal projectile impact at a non-vital sensor-location on the target, and incapacitated indicates a mortal projectile impact at a vital sensor location on the target.

2. The system according to claim 1, wherein said substrate is one of a ceramic tile, a paper sheet, a plastic panel, an epoxy plate, and said circuit is a wire trace disposed on a planar surface of said substrate.

3. The system according to claim 1, wherein said impact triggers an event indicator associated with a timestamp provided by a global positioning system satellite receiver.

4. The system according to claim 1, wherein said aggregation controller includes:
 a process controller for aggregating said status condition, and
 a relay transceiver for receiving said status condition from said instrumentation sensor and sending said aggregated information to said base station.

5. The system according to claim 1, wherein said base station includes:
 a graphical user interface (GUI) for converting said aggregated information into visual representation of the effectiveness on the target.

6. The system according to claim 1, wherein said each instrumentation sensor further includes:
 an impact detector for indicating said status condition;
 a second microprocessor for determining said status condition from said detector; and
 a bus for providing said status condition from said second microprocessor to said aggregation controller.

7. The system according to claim 6, wherein said bus is one of a conduction connection and a wireless transmitter.

8. An instrumentation sensor for disposition on a mannequin target in association with a detection system for monitoring antipersonnel effectiveness of a gun that fires a projectile against said target, said instrumentation sensor comprising:
 a transmitter for transmitting a status condition to the detection system based on electrical integrity, said status condition being one of intact as default and disablement in response to impact from the projectile, said default indicating electrical connection and said disablement indicating electrical disconnection;
 a frangible substrate that fractures upon said impact, thereby altering said status condition from said intact to said disablement;
 an electrical circuit disposed on said substrate that passes current therethrough in absence of said impact, and interrupts said current in response to disintegration of said substrate; and
 a processor for providing control for said transmitter and said current to said circuit;
 wherein the instrumentation sensor is part of a sensor system, and the sensor system comprising:
 an aggregation controller for receiving said status condition from said instrumentation sensor and transmitting said status condition and an anatomical position as aggregated information; and
 a base station for receiving said aggregated information for analysis to determine the effectiveness in response to the gun firing at the target,
 the target includes a plurality of instrumentation sensors, each instrumentation sensor being disposed at an anatomically analogous location in relation to a disablement status that indicates the effectiveness on the target, and such that healthy indicates impact absence, wounded indicates a non-lethal projectile impact at a non-vital sensor-location on the target, and incapacitated indicates a mortal projectile impact at a vital sensor location on the target.

9. The instrumentation sensor according to claim 8, wherein said substrate is one of a ceramic tile, a paper sheet, a plastic panel, an epoxy plate, and said circuit is a wire trace disposed on a planar surface of said substrate.

10. The instrumentation sensor according to claim 8, wherein said impact triggers an event indicator associated with a timestamp.

11. A sensor system for monitoring anti-personnel effectiveness of a gun that fires a projectile against a mannequin target, said system comprising:
 a plurality of instrumentation sensors for disposition on the target, said disposition of each instrumentation sensor of the plurality of instrumentation sensors being at an anatomically analogous location in relation to a disablement status that indicates the effectiveness on the target in response to impact from the projectile;
 an aggregation controller for receiving a status condition from said each instrumentation sensor of said plurality of instrumentation sensors and transmitting corresponding said status condition and said anatomically analogous location from said each instrumentation sensor as aggregated information; and
 a base station for receiving said aggregated information for analysis to determine the effectiveness in response to the gun firing at the target, wherein
 said disposition on the target corresponds to the anatomically analogous location in relation to the disablement status that indicates the effectiveness on the target, and
 said disablement status includes one of healthy, wounded and incapacitated, such that the healthy indicates impact absence, the wounded indicates a non-lethal projectile impact at a non-vital sensor-location on the target, and the incapacitated indicates a mortal projectile impact at a vital sensor location on the target, wherein said each instrumentation sensor includes:
 a transmitter for transmitting the status condition to said aggregation controller based on electrical integrity, said status condition being one of intact as default and disablement in response to impact from the projectile;
 a frangible substrate that fractures upon said impact, thereby altering said status condition from said intact to said disablement;
 an electrical circuit disposed on said substrate that passes current therethrough in absence of said impact, and interrupts said current in response to disintegration of said substrate; and
 a processor for providing control for said transmitter and said current, to said circuit.

12. The sensor system according to claim 11, wherein said instrumentation sensor further includes:
 an impact detector for indicating said status condition;
 a microprocessor for determining said status condition from said detector; and
 a bus for providing said status condition from said microprocessor to said aggregation controller.

13. The sensor system according to claim 11, wherein said circuit is a wire trace disposed on a planar surface of said substrate.

\* \* \* \* \*